United States Patent [19]

Chamberlain et al.

[11] 4,033,158
[45] July 5, 1977

[54] ADJUSTABLE STEERING WHEEL AND TRANSMISSION LOCK ARRANGEMENT

[75] Inventors: Richard W. Chamberlain; Michael E. Moore, both of Aurora, Ill.

[73] Assignee: Caterpillar Tractor Co., Peoria, Ill.

[22] Filed: Feb. 23, 1976

[21] Appl. No.: 660,559

[52] U.S. Cl. .................. 70/202; 70/237; 70/247; 74/493; 180/82 A; 280/775
[51] Int. Cl.² ........................ B60R 25/06
[58] Field of Search ............ 70/181, 201, 202, 210, 70/245, 247, 248, 237, 238, 252, 254; 74/493; 180/78, 82 A; 280/87 A, 87 HA

[56] References Cited
UNITED STATES PATENTS

| | | | |
|---|---|---|---|
| 2,127,171 | 8/1938 | Hawthorn | 74/493 |
| 2,629,246 | 2/1953 | Schumann | 70/181 |
| 2,679,744 | 6/1954 | Hildebrand | 70/202 |
| 2,910,887 | 11/1959 | Helms | 74/493 |
| 3,078,945 | 2/1963 | Frey | 74/493 X |
| 3,078,946 | 2/1963 | Young | 74/493 X |
| 3,553,987 | 1/1971 | Ball et al. | 70/248 X |
| 3,555,924 | 1/1971 | Scheffler | 74/493 |
| 3,718,053 | 2/1973 | Cinadr | 74/493 |
| 3,748,880 | 7/1973 | Atkins | 70/181 X |
| 3,810,369 | 5/1974 | Giovanniello | 70/247 X |

FOREIGN PATENTS OR APPLICATIONS

| | | | |
|---|---|---|---|
| 1,259,475 | 3/1961 | France | 70/181 |
| 1,191,444 | 5/1970 | United Kingdom | 70/238 |

*Primary Examiner*—Marion Parsons, Jr.
*Assistant Examiner*—Rodney H. Bonck
*Attorney, Agent, or Firm*—John W. Grant

[57] ABSTRACT

A steering column is pivotally fastened to a support structure and pivots between an operating position and a transmission locking position. A steering wheel is rotatably supported at the upper end of the steering column while a transmission shift lever is fastened at one side of the steering column and shiftable between a forward speed position, a neutral position and a reverse speed position. A latching mechanism is carried by the steering column and is engageable with one of a plurality of notches formed in a positioning rack secured to the support structure for latching the steering column in the transmission locking position and engageable with another of the notches for latching the steering column in the operating position. A transmission locking member is secured to the support structure and extends towards the transmission shift lever for abutment therewith when the steering column is in the transmission locking position for locking the transmission shift lever in the neutral position.

10 Claims, 5 Drawing Figures

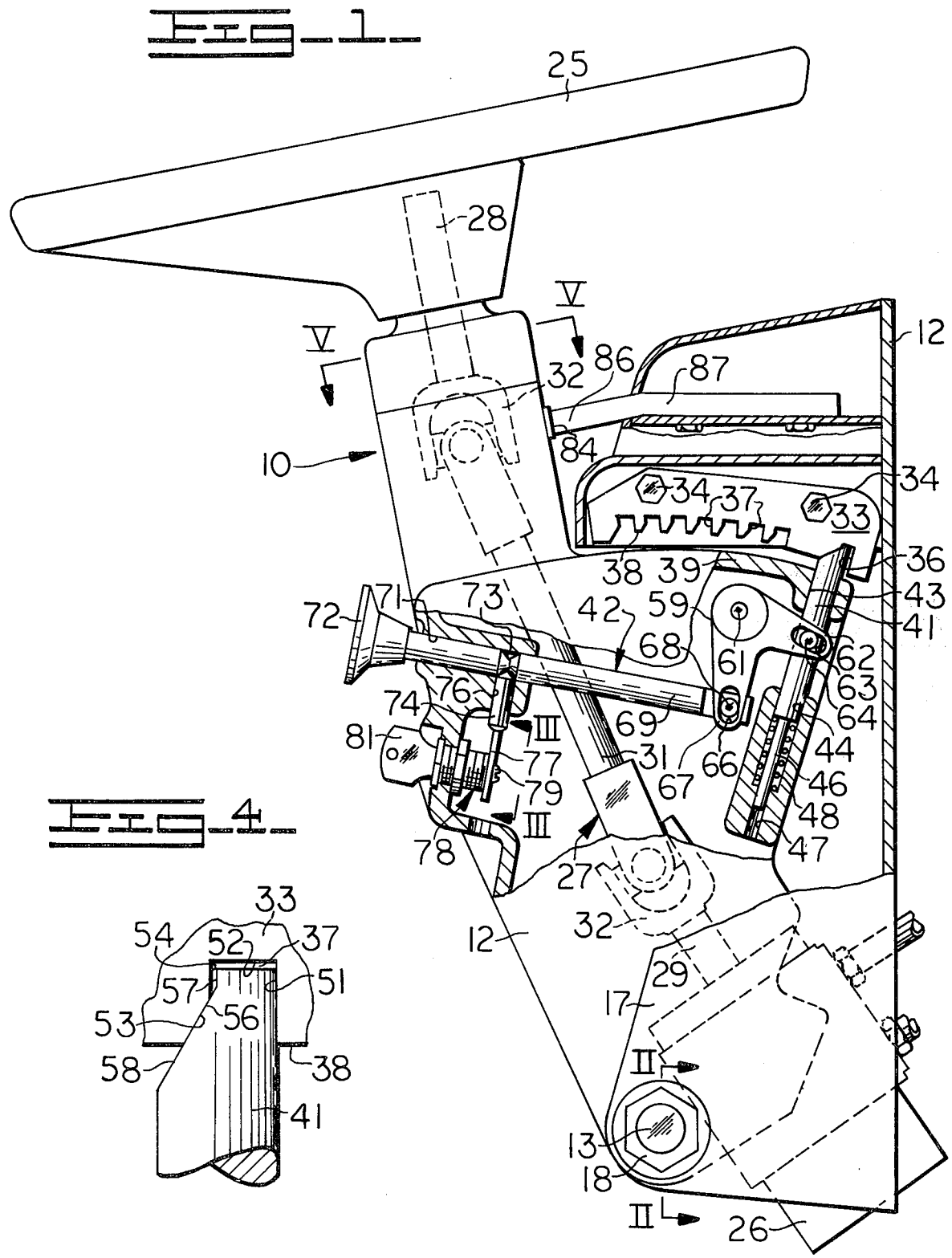

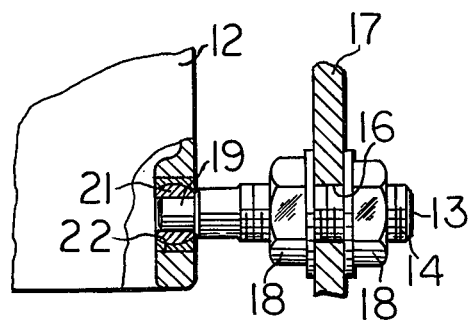
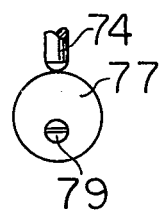
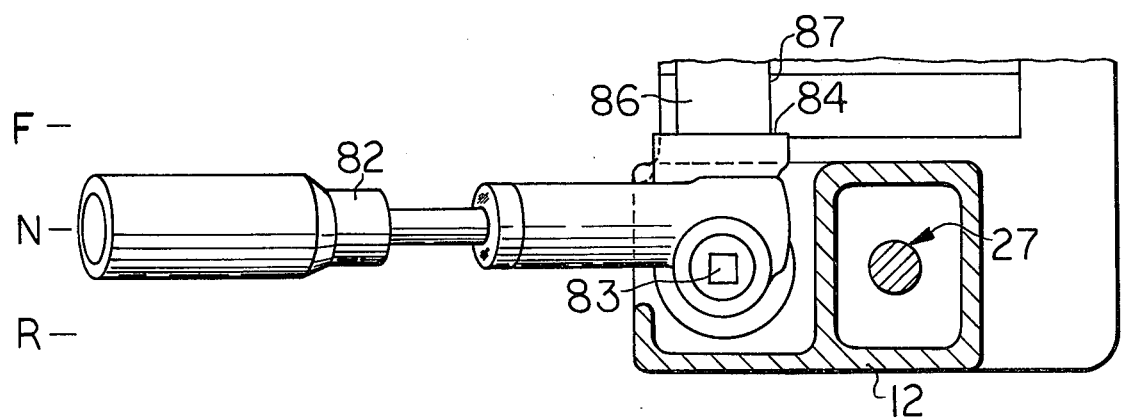

ADJUSTABLE STEERING WHEEL AND TRANSMISSION LOCK ARRANGEMENT

BACKGROUND OF THE INVENTION

Tilting steering wheels are frequently employed in earthmoving vehicles to provide improved operator comfort during operation of the vehicle. Such steering wheels may be tilted out of the operator's way for easy access to and departure from the operator's seat. It is common practice for the operator of an earthmoving vehicle to leave the engine running when he gets off the vehicle for a short duration of time. However, on many of such vehicles, heretofore there has not been any convenient or simple way of locking the transmission in the neutral position and the operator had to be careful not to bump the transmission shift lever into an operating range when getting off or on the vehicle.

OBJECTS OF THE INVENTION

Accordingly, an object of this invention is to provide an improved adjustable steering wheel and transmission lock arrangement which permits both the steering wheel and the transmission shift lever to be adjusted in unison for operator comfort during operation of the vehicle and adjusted out of the way for easy access to the operator's seat.

Another object of this invention is to provide such an improved adjustable steering wheel and transmission lock arrangement which latches the transmission shift lever in the neutral position when the steering wheel is tilted to a transmission locking position for easy access to the operator seat.

Another object of this invention is to provide an improved adjustable steering wheel and transmission locking position and the transmission shift lever in the neutral position to prevent unauthorized operation of the vehicle.

Other objects and advantages of this invention will become more readily apparent upon reference to the accompanying drawings and following description.

BRIEF DESCRIPTION OF THE DRAWINGS

FIG. 1 is a side elevational view of an adjustable steering wheel and transmission lock arrangement embodying the principles of the present invention with portions broken away for illustrative convenience.

FIG. 2 is a cross sectional view taken along line II—II of FIG. 1.

FIG. 3 is a partial view of a lock mechanism as viewed along line III—III of FIG. 1.

FIG. 4 is a somewhat enlarged fragementary view of the latching mechanism when the steering wheel is in an operating position.

FIG. 5 is a sectional view taken along line V—V of FIG. 1.

DESCRIPTION OF THE PREFERRED EMBODIMENT

Referring to the drawings, an adjustable steering wheel and transmission lock arrangement embodying the principles of the present invention is generally indicated by the reference numeral 10 and includes a vertically oriented support structure 11 as part of a vehicle, not shown. A hollow steering column 12 has its lower end pivotally connected to the support structure by a pair of axially aligned horizontally oriented pivot pins, one of which is shown at 13. As more clearly shonw in FIG. 2, each of the pivot pins has a threaded portion 14 extending through an aperture 16 formed in a vertical wall 17 of the support structure and is secured thereto by a pair of nuts 18 screw threaded onto the threaded portion and disposed on opposite sides of the wall. A reduced diameter end portion 19 of each pivot pin extends into a spherical bearing 21 seated in a bore 22 formed in the lower end of the steering column.

A steering wheel 25 is rotatably supported at the upper end of the steering column 12 and is connected to a hydraulic steering control unit 26 through a steering shaft assembly 27. The shaft assembly includes a pair of end shafts 28 and 29 secured to the steering wheel and hydraulic control unit, respectively, and are connected to opposite ends of an intermediate shaft 31 through a pair of U-joints 32.

A positioner rack 33 is secured to the support structure 11 by a pair of bolts 34 and has a downwardly opening transmission locking position notch 36 and a plurality of spaced downwardly opening operating position notches 37 formed in a lower edge 38 which is disposed adjacent to an upper wall 39 of the steering column 12. The notches are arranged to receive an upper end of a plunger 41 forming part of a latcching mechanism 42 which is carried by the steering column and cooperates with the positioner rack for latching the steering column in a predetermined position. The plunger is slidably disposed for rectilinear movement along its longitudinal axis within a pair or axially aligned bores 43 and 44 formed in the steering column. A reduced diameter stem 46 is formed on the lower end of the plunger and slidably extends into a bore 47 concentric with the bore 44. A coil compression spring 48 circumscribes the stem and is disposed within the bore 44 resiliently to urge the plunger upwardly into meshing engagement with the notches.

The shape of the ends of the plunger substantially matches the shape of the notches. As more clearly shown in FIG. 4 which illustrates the meshing relation between the end of the plunger and one of the operating notches 37, each of the notches has a straight side 51 disposed parallel to the axis of the plunger, a bottom surface 52 and a side 53 opposite to the straight side. The side 53 is formed by a straight portion 54 adjacent ot the bottom surface and a bevelled portion 56 which intersects the straight portion and the lower edge 38. The end of the plunger has a flat face 57 formed thereon at its extremity and parallel to its longitudinal axis and a tapered or wedge surface 58 which intersects with the face and matches the bevelled portion of the notches.

A bell crank 59 is disposed within the steering column 12 and is pivotally mounted on a pivot pin 61 extending into the interior of the steering column. A first arm 62 of the bell crank is disposed adjacent to the plunger 41 and has a slot 63 formed in its end with the slot receiving a pin 64 secured to the plunger. Similarly, a slot 66 is formed in the end of a second arm 67 of the bell crank and receives a pin 68 which extends through a control rod 69. The control rod slidably extends through a bore 71 in the steering column and has an actuator knob 72 fastened to its outwardly protruding end. An annular V-shaped groove 73 is formed in the rod to receive the end of a pin 74 slidably disposed within a bore 76 which is formed in the steering column substantially normal to the bore 71. As more clearly shown in FIG. 3, the pin is supported on a cam 77 which is fastened to a lock mechanism 78 by a cap screw 79. The lock mechanism is operated by a removable key 81.

As more clearly shown in FIG. 5, a transmission shift lever 82 extends laterally outwardly at the left side of the steering column 12 and is attached to an upwardly extending member 83 of a shift mechanism, not shown, which is pivotally contained within the steering column at the left side of the steering shaft assemmbly 27 and is operatively connected to the transmission for changing the speeds and direction of travel of the vehicle. The transmission shift lever is pivotal between a forward speed position, a neutral position, and a revverse speed position indicated by the letters F, N and R, respectively. A contact face 84 is formed on the lever in position to contact an end 86 of an elongated transmission lock block 87 which is secured to the support structure 11 and extends outwardly therefrom toward the transmission shift lever.

OPERATION

While the operation of the present invention is believed clearly apparent from the foregoing description, further amplification will subsequently be made in the following brief summary of such operation. Initially, the first step in preparing the adjustable steering wheel and transmission lock arrangement 10 for operation after it has previously been locked in the transmission lock position is to rotate the key 81 of the lock mechanism 78 in the appropriate direction for rotating the cam 77 to permit the pin 74 to drop downwardly to a noninterfering position relative to the annular groove 73 formed in the control rod 69. The operator then pulls the knob 72 to rotate the bell crank 59 clockwise about the pin 61 moving the plunger 41 downwardly against the bias of the spring 48. In so doing, the end of the plunger is disengaged from the notch 36 to permit the steering column 12 to be rotated about the pivot pin 13 to a comfortable operating position of the steering wheel 25. The operator then releases the knob and the spring urges the plunger upwardly so that the end engages one of the operating position notches 37.

With reference to FIG. 4, during engagement of the end of the plunger 41 and the operating position notch 37, the tapered surface 58 of the plunger engages the bevelled surface 56 of the notch and acts as a self-adjusting ramp to force the end of the plunger into contact with the straight side 51 of the notch. This eliminates any looseness or play in the steering wheel and provides the operator with a stable steering wheel to grip. Although the bevelled surface may act as a ramp to force the plunger downwardly if sufficient force is applied to the steering wheel or column, such downward movement would be limited to a very small increment by contact between the flat face 57 of the plunger and the straight portion 54 of the notch.

The above-described contact between the plunger 41 and the operating position notch 37 limits the extension of the plunger to a distance less than that permitted when the plunger is in meshing engagement with the locking position notch 36. This results in the control rod 69 being positioned to the left of its position s shown in FIG. 1 so that the pin 74 will not engage the annular groove 73 sufficiently to permit the cam 77 and key 81 of the lock mechanism 78 to be rotated to the locked position.

To move the steering column 12 from one of its operating positions as determined by the operating position notches 37 to the transmission locking position, the operator shifts the transmission shift lever 82 to its neutral position and then pulls the knob 72 to disengage the plunger 41 from the operating notch and then physically pivots the steering column clockwise about the pivots 13. In so doing, the transmission shift lever is moved therewith and the contact face 84 formed thereon engages the end 86 of the transmission lock block 87. The operator then releases the knob and the spring 48 urges the plunger into engagement with the transmission lock notch. The depth of the notch 36 is selected so that when the end of the plunger engages the bottom surface 52 of the notch, the annular groove 73 of the control rod 69 is in alignment with the pin 74. Thus, the key 81 of the lock member 78 can be rotated to rotate the cam 77 for moving the pin 74 into engagement with the annular notch as shown in FIG. 1 and the key removed. With the pin 74 in the position shown, the control rod 69 can not be moved to disengage the plunger from the transmission lock notch and thereby maintains the transmission shift lever in the neutral position to prevent unauthorized operation of the vehicle.

In view of the foregoing, it is readily apparent that the structure of the present invention provides an improved adjustable steering wheel and transmission lock arrangement which permits the steering wheel and the transmission shift lever to be adjusted in unison to one of a plurality of operating positions for operating comfort and to be adjusted to an extreme position to provide easy access to the operator seat. When the steering wheel is in the extreme position, a transmission lock member engages the transmission shift lever in the neutral position to prevent inadvertent engagement of the transmission as the operator is entering or leaving the seat or operator station. Furthermore, the latching mechanism of the adjustable steering wheel and transmission lock arrangement may be locked in the extreme position with a lock mechanism and removable key to prevent unauthorized operation of the vehicle when the vehicle is left unattended.

While the invention has been described and shown with particular reference to the preferred embodiment, if will be apparent that variations might be possible that would fall within the scope of the present invention which is not intended to be limited except as defined in the following claims.

What is claimed is:

1. An adjustable steering wheel and transmission lock arrangement comprising:
    a supporting structure,
    a transmission shift lever being shiftable between a forward speed position, a neutral position, and a reverse speed position;
    a steering column pivotally fastened to the supporting structure, said transmission shift lever being fastened to one side of the steering column, said steering column being pivotal in a vertical direction between a plurality of operating positions at all positions of the transmission shift lever and to a transmission locking position when the transmission shift lever is in the neutral position;
    a positioning member secured to the support structure and having a plurality of spaced notches formed therein with one of the notches representing the transmission locking position and the other notches each representing an operating position of the steering column;

latching means carried by the steering column and being operative independent of the transmission shift lever for engagement with said one of the notches for latching the steering column in the transmission locking position and for engagement with any of the other notches for latching the steering column in one of the operating positions; and a transmission locking member secured to the support structure, said transmission locking member being positioned in the pathway of the transmission shift lever for abutment therewith when the steering column is in the transmission locking position for locking the transmission shift lever in the neutral position.

2. The arrangement as set forth in claim 1 including a lock mechanism operatively connected with the latching means for locking the latching means in engagement with said one notch.

3. The arrangement as set forth in claim 1 wherein said latching means includes a plunger having a first position in which an end is engageable with the notches and a second position in which the end is disengaged from the notches and means for selectively moving the plunger from said first position to said second position.

4. The arrangement as set forth in claim 3 wherein said moving means includes a control rod slidably carried by the steering column, and a bell crank pivotally carried by the steering column and having a first arm operatively connected to the plunger and a second arm operatively connected to the control rod such that sliding movement of the control rod results in moving the plunger between its first and second positions.

5. The arrangement as set forth in claim 4 wherein said latching means includes a spring carried by the steering column and operatively connected to the plunger for resiliently resisting movement of the plunger from its first to its second position and for resiliently urging the plunger from its second position to its first position.

6. The arrangement as set forth in claim 5 wherein said transmission shift lever has a contact face formed thereon for engagement with the transmission locking member.

7. The arrangement as set forth in claim 6 wherein said control rod has an annular groove formed therein, and including a pin slidably carried by the steering column and positioned for insertion into the groove for preventing sliding movement of the control rod, and a lock mechanism carried by the steering column and operatively connected to the pin for inserting the pin into the annular groove.

8. The arrangement as set forth in claim 7 wherein said lock mechanism includes a cam in contact with the pin and a key operatively connected to the cam for imparting rotation thereto when the key is rotated, said key being removable from the lock mechanism when the pin is inserted into the annular groove of the control rod.

9. The arrangement as set forth in claim 8 wherein each of said notches formed in the positioning member has a side formed by a straight portion and a bevelled portion, and said plunger has a flat face formed thereon at its end substantially parallel to the straight portion of the notch when the plunger is engaged with the notch, and a tapered surface substantially matching the bevelled portion.

10. An adjustable steering wheel and transmission lock arrangement comprising:

a supporting structure, a transmission shift lever being shiftable between a forward speed position, a neutral position, and a reverse speed position;

a steering column pivotally fastened to the supporting structure, said transmission shift lever being fastened to one side of the steering column, said steering column being pivotal in a vertical direction between a plurality of operating positions at all positions of the transmission shift lever and to a transmission locking position when the transmission shift lever is in the neutral position;

a transmission locking member secured to the support structure, said transmission locking member being positioned in the pathway of the transmission shift lever for abutment therewith and being of a construction sufficient to lock the transmission shift lever in the neutral position at the transmission locking position of the steering column;

a positioning member secured to the support structure and having a plurality of spaced notches formed therein with one of the notches representing the transmission locking position and the other notches each representing an operating position of the steering column;

a plunger slidably carried by the steering column and being operative independent of the transmission shift lever, said positioning member being of a construction sufficient for engagement with said one of the notches for latching the steering column in the transmission locking position and for engagement with any of the other notches for latching the steering column in one of the operating positions;

a bell crank pivotally carried by the steering column and having a pair of arms with one of said arms being operatively connected to the plunger;

a control rod slidably carried by the steering column and operatively connected to the other of said arms of the bell crank said control rod being of a construction sufficient for actuation of the control rod in one direction for imparting movement to the plunger to disengage the plunger from the notches; and lock means carried by the steering column and engageable with the control rod for preventing sliding movement thereof when the plunger is in engagement with said one notch.

* * * * *